United States Patent
Wasserstrom et al.

(10) Patent No.: US 11,650,835 B1
(45) Date of Patent: May 16, 2023

(54) MULTIPLE PORT EMULATION

(71) Applicant: Amazon Technologies, Inc., Reno, NV (US)

(72) Inventors: Barak Wasserstrom, Mitzpe Aviv (IL); Said Bshara, Tira (IL); Akram Baransi, Nazareth Illit (IL); Omri Itach, Haifa (IL); Tal Zilcer, Hadera (IL)

(73) Assignee: AMAZON TECHNOLOGIES, INC., Reno, NV (US)

( * ) Notice: Subject to any disclaimer, the term of this patent is extended or adjusted under 35 U.S.C. 154(b) by 476 days.

(21) Appl. No.: 16/836,527

(22) Filed: Mar. 31, 2020

(51) Int. Cl.
*G06F 9/45* (2006.01)
*G06F 9/455* (2018.01)
*G06F 13/42* (2006.01)

(52) U.S. Cl.
CPC .......... *G06F 9/455* (2013.01); *G06F 13/4282* (2013.01); *G06F 2213/0026* (2013.01)

(58) Field of Classification Search
None
See application file for complete search history.

(56) References Cited

U.S. PATENT DOCUMENTS

| | | | |
|---|---|---|---|
| 9,928,207 B1 | 3/2018 | Habusha et al. | |
| 10,255,213 B1 | 4/2019 | Habusha et al. | |
| 10,691,580 B1* | 6/2020 | Kasat | G06F 11/364 |
| 10,977,051 B1* | 4/2021 | Karman | G06F 13/4282 |
| 2017/0024344 A1* | 1/2017 | Shetty | G06F 13/385 |
| 2019/0095554 A1* | 3/2019 | Ooi | G06F 30/33 |
| 2020/0151104 A1* | 5/2020 | Yang | G06F 12/0804 |

* cited by examiner

*Primary Examiner* — Craig C Dorais
(74) *Attorney, Agent, or Firm* — Hogan Lovells US LLP

(57) ABSTRACT

Multiple independent endpoint devices can be emulated using a single system on chip (SoC) device. Such a SoC can have multiple cores that can emulate ports according to a specified protocol, such as the peripheral component interconnect express (PCIe) protocol useful for data communications. An emulation agent can manage various aspects of these emulated endpoint devices in software, including serving interrupts for relevant emulated devices according to a determined priority scheme. Interrupts can be registered for each device, and data structures allocated dynamically for a determined number and type(s) of PCIe endpoint devices to be emulated. Each PCIe core on the SoC can function as a separate PCIe endpoint device endpoint for communicating with one or more hosts or other such devices.

20 Claims, 8 Drawing Sheets

MULTIPLE PORT EMULATION

BACKGROUND

As an ever-increasing amount of data is being transmitted and processed electronically, there is a corresponding desire to improve the performance of these tasks. Various protocols are used to manage the transmission of data between source and destination locations. A protocol such as the peripheral component interconnect express (PCIe) protocol can be used, which is an interface standard for connecting high-speed components. A motherboard on a conventional computing device might include a number of PCIe slots that can be used to add PCIe compatible devices, such as graphics processing units, Wi-Fi cards, storage devices, and the like. The need for multiple physical PCIe devices comes with certain costs in provisioning, management, and maintenance, however, and may not provide for optimal performance.

BRIEF DESCRIPTION OF THE DRAWINGS

Various embodiments in accordance with the present disclosure will be described with reference to the drawings, in which.

DETAILED DESCRIPTION

Approaches in accordance with various embodiments provide for the management of data transmissions and processing in a computing environment. In particular, various embodiments provide for the emulation of multiple independent endpoints or bridge devices on a single device. This can include, for example, emulation of multiple independent peripheral component interconnect express (PCIe) endpoints using a single printed circuit board (PCB) or system on chip (SoC) device. In conventional systems, separate physical PCIe devices (e.g., PCIe cards) are required and connected to a separate PCIe root complex. Approaches in various embodiments can take advantage of the presence of multiple PCIe ports of an SoC device to provide for the emulation of multiple PCIe ports on a single SoC device. An emulation agent can manage various aspects of these emulated ports in software, including serving root complex PCIe config transactions (e.g., reads and writes), using dedicated interrupts per port, for relevant emulated ports. Interrupts can be registered for each port, and data structures allocated dynamically for a determined number and type(s) of ports to be emulated. Each PCIe core on the SoC can then function as a separate PCIe port or device endpoint for communicating with one or more hosts or other such devices.

In the description herein, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. Various other functions can be implemented within the various embodiments as well as discussed and suggested elsewhere herein.

Figure 1:
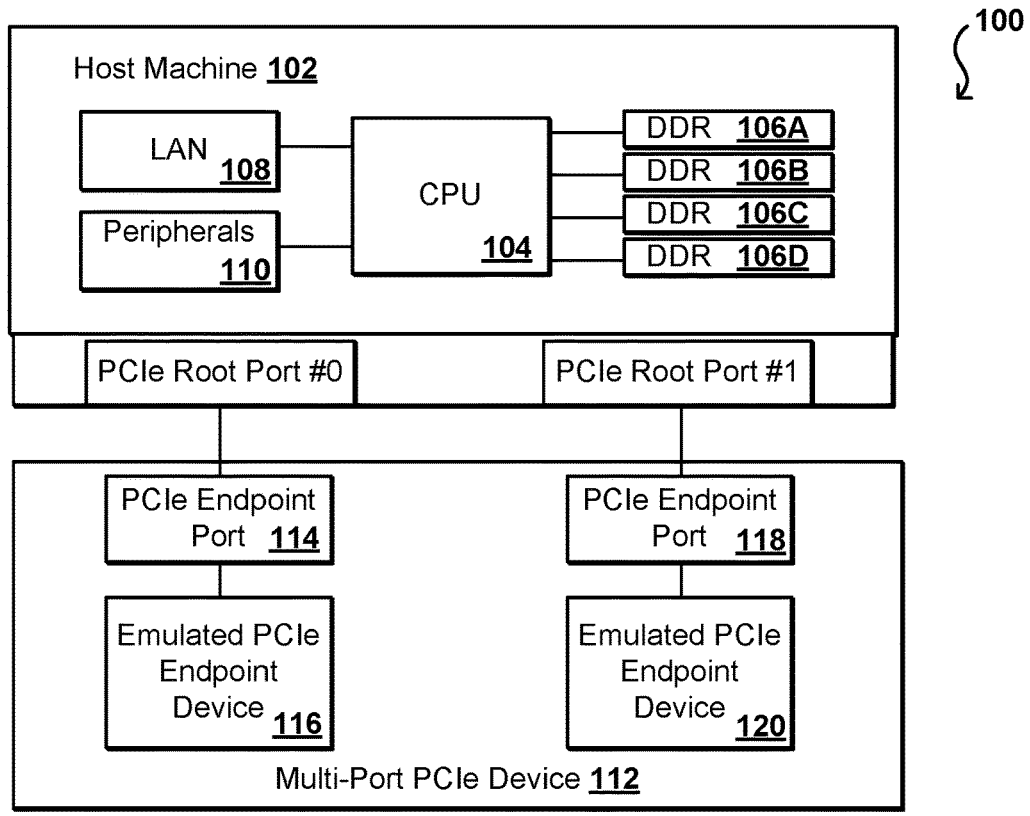
FIG. 1 illustrates components of an example computing system that can be utilized in accordance with various embodiments.

In many computer environments, there will be various components that will need to transfer data to other components, of various types and at various locations. FIG. 1 illustrates an example environment 100 in which components on a host machine 102 may communicate with other components on, or external to, the host machine 102. In order to facilitate communications between different types of components (or systems, devices, etc.), various standards can be utilized. As mentioned above, one such standard is the PCIe protocol. As with other protocols, PCIe imposes rules on transactions traveling through a PCIe fabric. These rules help to ensure that the various transactions are completed successfully, to avoid data loss or corruption, deadlocks, and other such issues. For conventional PCIe there are three types of transactions, including I/O transactions (e.g., for deprecated legacy PCI devices), memory transactions, and config transactions. Other types of packets or transactions can be utilized for the same or other protocols or standards within the scope of the various embodiments. In the present example, a PCIe device can perform actions such as to write data to, and read data from, memory (such as DDR memory 106A-D) on the host device.

It might be the case that other protocols are used to manage data transmission in a given computer system. For example, an interconnect protocol such as Advanced eXtensible Interface (AXI) is used by many system on chip (SoC) designers. The AXI protocol establishes rules for communications between different modules on a chip, requiring a type of handshake before a given transmission is performed in at least some instances. Such an approach provides an effective medium for transfer of data between the existing components on a chip. AXI defines two independent request channels for read and write operations, and two corresponding independent completion channels, for both read and write completion packets. There are no ordering rules between the different AXI channels, and every transaction is marked with an ID.

PCIe can manage the way in which components of a host machine 102 communicate with other PCIe-compatible devices, which can each act as an endpoint for communications as illustrated by the PCIe endpoint devices 114, 120. The host machine 102 can communicate through a PCIe interface in at least some embodiments, such as may include any appropriate I/O device. This can include, as mentioned, I/O, memory, and configuration transactions. The communications can utilize one or more bi-directional channels between the host machine 102 and multi-port PCIe device 112, for example, which can direct communications through a PCIe fabric to the various PCIe endpoint ports 114, 118 to be received by different emulated PCIe endpoint devices 116, 120. This embodiment then represents a single-card, multi-port PCIe device connected to a single host via different PCIe root ports. Each PCIe device can include a processor and memory that can assist in transaction management, while at least some of the management can be performed on a CPU 104 of the host machine, among other such options. The CPU may use other protocols to communicate with other components as well, such as to communicate with a local area network (LAN) card 108 or various peripherals 110, etc. As mentioned, this may include a transaction such as a read transaction, which includes a request to read data and a response that includes the requested data, received over the appropriate channel.

Figure 2:
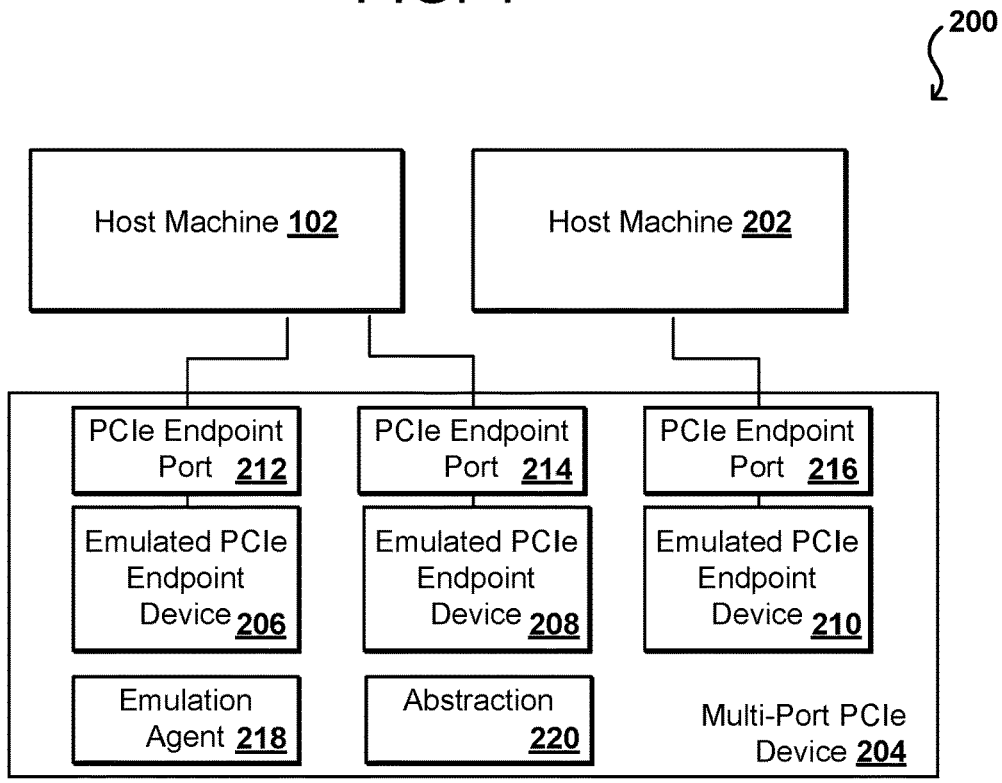
FIG. 2 illustrates components of an example computing system with multiple PCIe port emulation that can be utilized in accordance with various embodiments.

In conventional approaches, each PCIe endpoint device would require a dedicated PCIe card for communication. Approaches in accordance with various embodiments can utilize a PCIe endpoint device, or system on chip (SoC), as illustrated in FIG. 2, that has multiple PCIe cores, such as four, eight PCIe, or another number of cores. In various embodiments, there can be multiple emulated PCIe endpoint ports 212, 214, 216 for corresponding emulated PCIe endpoint devices 206, 208, 210. In at least one embodiment, this can enable a single PCIe endpoint device 204 to communicate with PCIe connectors on a single host machine 102, or PCIe connectors on multiple host machines 102, 202, where a given emulated endpoint device can communicate with a specified host. As illustrated, emulated PCIe endpoint devices can communicate with the same host machine or different host machines.

In at least one embodiment, a PCIe configuration emulation agent can be used to emulate PCIe configuration space. Conventional PCIe cards have a PCIe hardware controller that is designed to receive and handle PCIe configuration space transactions. Use of an emulation agent 218, however, allows for these transactions to be handled dynamically. In at least some embodiments, an emulation agent on a PCIe device can also handle and maintain PCIe link events. In at least one embodiment, an emulation agent can be triggered at runtime only from interrupts. One such interrupt is a PCIe configuration space interrupt, which can be triggered by a configuration space read or write from a host to a PCIe device, such as a physical PCIe card. Other interrupts include PCIe controller and controller reset interrupts (e.g., PCIe link down/up, or link speed change), or a timer interrupt, to periodically poll on PCIe link status and handle that status while in link training stage. An application-dedicated message interrupt can also be utilized. In at least one embodiment, various configuration space and internal data structures are prepared at boot time, before enabling PCIe interrupts. This can include, for example, host communication APIs that allow control/debug/access from a host to the emulation agent and SoC, as well as application communication APIs that allow control/debug/access from apps running on the SoC to the emulation agent. Data structures can also include non-upgradable text, as may be useful for placing code of interrupt handler routines in a fixed memory location, as well as non-upgradable data, as may include agent internal settings (e.g., interrupt handler pointers, host communication configurations, MMU sections) and states that are unmodified during a live update.

In devices with multiple PCIe cores, each PCIe port can have a dedicated PCIe configuration space and PCIe controller interrupts. An emulation agent can handle PCIe configuration space emulation on multiple PCIe ports by registering to specific interrupts per PCIe port, as may include a PCIe configuration space interrupt and a PCIe controller interrupt. In at least some embodiments, an SoC interrupt controller hardware unit can use a round-robin priority scheme approach, that serves each interrupt in its turn. Having an emulation agent respond to each configuration request with a strict timing limitation, in combination with a round robin-based interrupt approach, ensures that interrupt starvation will not occur in at least most implementations. If a certain use case requires improved handling, such as for a specific server root complex port, the emulation agent software may decide to prioritize serving the interrupt of that certain endpoint with a forced approach by software that will manually poll and handle all raised interrupts from that endpoint, thus ensuring a precise handling according to use case requirements and timing limitations.

In at least one embodiment, PCIe emulation data structures can be configured to support up to eight PCIe ports, although other numbers of PCIe ports may be possible in other devices or implementations. Due at least in part to memory layout restrictions, as well as potential backward support for older models running for single ports, multi-port structures are not placed contiguously in memory. In at least one embodiment data structures will be dynamically allocated and placed according to the target use case, as well as the number and/or type of ports currently emulated. In order to avoid runtime overhead, such as during configuration reads and writes from a host, of port differentiation and struct layout detection, an abstraction component 220 or layer for all multi-port data structures can be added to simplify and improve runtime access for multi-port properties. In at least one embodiment, such an abstraction component 220 can include a layer of pointers to each of the above data structs, which can be added per PCIe port and initialized at boot time to point to the correct memory data structures of that PCIe port. Such an abstraction component 218 can also cause all runtime access to a PCIe port's structures to be provided via direct access using these pointers. In at least one embodiment, a software emulation live update procedure can include a re-initialization stage for that layer of pointers, that will cover even older emulation agent models, to allow coherent and generic usage of these data structures using the layer of pointers to access data structures.

In at least one embodiment, a single SoC can be used to connect two PCIe endpoint ports from that single SoC to two separate PCI root complex ports of a single host. Such an SoC can also be used to connect two PCIe endpoint ports of that single SoC to two separate hosts. Enabling the use of two or more PCIe endpoint ports on the same SoC can offer benefits beyond those obtained if combining two SoCs on a single card, including an introduction of new capabilities and significant improvement of traffic performance achieved by these cards on various servers or host devices. For example, a SoC can provide more computer power than can be utilized in parallel for many applications, taking advantage of its multiple CPU cores. Such an SoC can also support PCIe 4.0, while conventional hosts may support only PCIe 3.0. Such an SoC can also offer improved and optimized networking capabilities, with bandwidth that can be fully utilized by a single PCIe port, utilizing PCIe Gen 4.0 speed capabilities. Such an SoC can also allow existing hosts with PCIe 3.0 to enjoy these improved networking capabilities by, for example, using two PCIe 3.0 endpoint ports from the same SoC connected to same host, offering full network bandwidth of the SoC.

In at least one embodiment, multiple PCIe endpoint devices on a single SoC can be connected to the same server using a single SoC. The ability to expose two PCIe endpoints from a single SoC to two PCIe root complex ports of a single host can reduce manufacturing costs by reducing the need for another SoC on the same circuit board, and can significantly reduce board complexity. In another embodiment, multiple PCIe endpoints emulated using a single SoC can be connected to multiple servers. A different utilization is to connect two PCIe endpoints from a single SoC, to two (or more) separate serves, thereby reducing card costs entirely for other servers by re-using a single SoC that serves in parallel the needs of two (or more) servers.

In some embodiments, an SoC can utilize a PCIe wrapper in conjunction with a PCIe logger. A PCIe wrapper can be used to capture PCIe configuration for PCIe transactions targeted to an emulated PCIe endpoint device. These transactions, which trigger an interrupt, have responses managed by software. The PCIe logger also triggers interrupts in software for memory transactions for an emulated PCIe device. Both configuration and memory transactions are captured by the hardware and treated as interrupts to be handled by software. In this way, PCIe handling for configuration and memory transactions can be managed dynamically at runtime by an updateable software agent. Different types of PCIe devices (e.g., for network cards or storage devices) can then be emulated and managed using a PCIe switch. Even though a single PCIe card may be connected to a host, that host can see multiple PCIe devices or device endpoints.

An SoC can have several PCIe cores, as mentioned, and each PCIe core can have a respective PCIe wrapper for configuration transactions and PCIe logger for memory transactions, enabling those cores to be utilized to emulate different PCIe cards on different connectors. Instead of just connecting a single PCIe connector to the host, on top of which the PCIe connector emulates several entities like a switch or physical functions, these different PCIe cores can be used to connect to a given host, or multiple hosts, in such a way that the host(s) sees different physical PCIe connectors. As mentioned, in a conventional approach multiple hosts would each require a separate physical PCIe card with a respective SoC, but approaches in accordance with various embodiments can enable a single device with multiple PCIe cores to emulate multiple ports, whereby a number of physical PCIe devices needed is reduced. In one embodiment there are two different endpoints per PCIe core, including a wrapper endpoint and a logger endpoint.

In some embodiments these multiple ports can be used to provide enhanced performance capabilities. For example, a single port may be limited in an amount of capacity that can be provided, such as only up to 100 GB of Ethernet network traffic. In at least one embodiment, two of the emulated ports can be used, each at 100 GB of Ethernet capacity, to provide 200 GB of capacity through this bi-furcated port.

Figure 3:
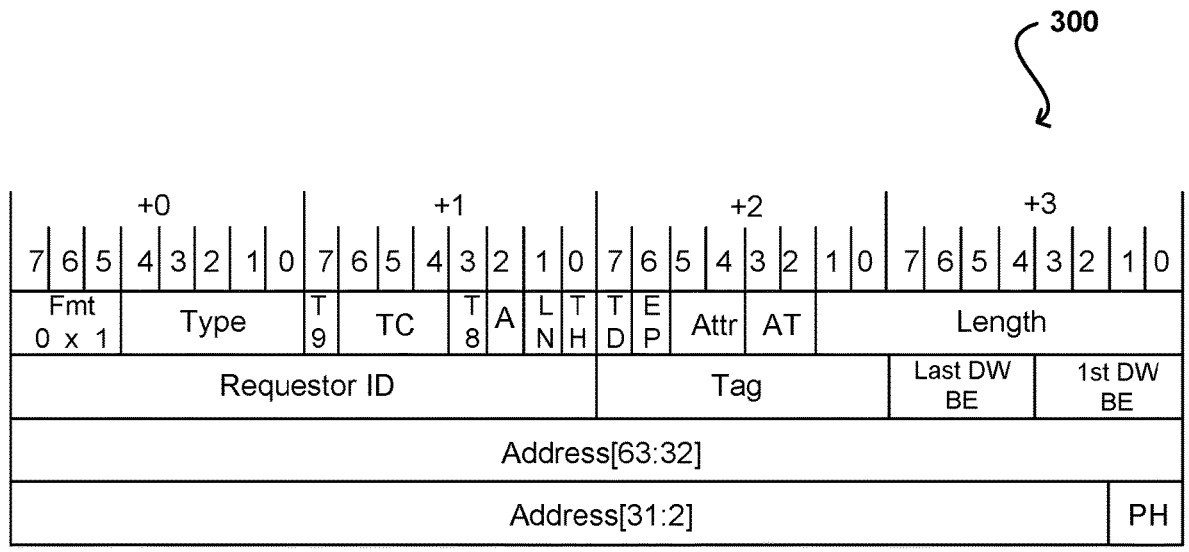
FIG. 3 illustrates an example PCIe request header that can be utilized in accordance with various embodiments.

FIG. 3 illustrates example request header 300 that can be used for addressing of memory according to the PCIe standard. As illustrated, the request header 300 includes a number of fields that can be used by a host CPU scanning a PCIe bus to detect the presence of a PCIe device. A Requestor ID field can identify the source of the packet, while other fields provide information about the type, length, attributes, and other aspects of the packet. In one embodiment, information can be extracted from such a PCIe packet to determine whether to accelerate the packet and/or enforce ordering. In one embodiment, this information includes the requestor identifier, or the PCI_ID of the originator of the transaction, which can be relevant for memory requests including both reads and writes. The information to be extracted can also include a completer identifier, such as the PCI_ID of the completer of the transaction, which can be relevant for completions. Other information can be extracted as well, as may include a steering tag, a target memory address, a relaxed ordering attribute, and an ID ordering attribute, among other such options.

In some embodiments a value such as a flush type can be used to indicate how ordering is to be enforced for a particular transaction. As mentioned, an internal protocol such as AXI may be used within a network device. AXI has a write channel and a read channel that are independent. AXI can enforce ordering between transactions within the same channel, using a field such as "transaction ID" in the AXI channel. A value such as a flush type value can be used to indicate whether to enforce ordering by memory writes in the same ordering domain, as it may be desirable in some situations to ensure that the memory writes are performed in order. A flush type can be used to indicate how ordering is to be enforced for a transaction, such as to specify an ordering enforcement method to be used. The information extracted from a packet header can then be used to determine the PCI_ID, the ordering requirement for the packet, and the way in which the ordering requirement is to be enforced for the packet. As mentioned, this model is configurable such that any relevant information can be included in, and extracted from, a packet on a transaction.

In at least some embodiments the PCIe transaction is converted to AXI. The model receives the PCIe transaction and converts PCIe packets for the transaction to an AXI transaction, which is then passed to the relevant target. In at least some embodiments there will be a PCI to AXI bridge to facilitate the communication, where the destination may be on the corresponding chip. So if there is a server with a processor and a PCIe card, and the PCIe card has a processor, then the block (or other grouping of logic) might execute in both the host processor and the PCIe card. The block can also execute in a storage device or network device, among other such options, with the ordering rules in at least some embodiments being stored in firmware.

Figure 4:
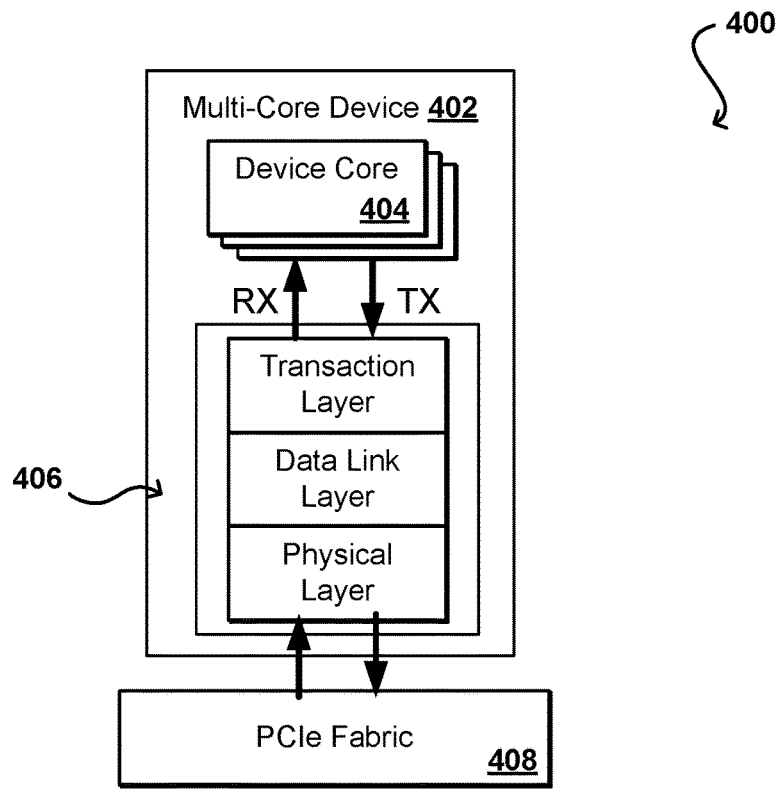
FIG. 4 illustrates components of an example PCIe device that can be utilized in accordance with various embodiments.

FIG. 4 illustrates an example PCIe device configuration 400 that can be utilized in accordance with various embodiments, where multiple PCIe endpoints can correspond to respective PCIe cores 404 on a specific multi-core device 402. In order to read data in some embodiments, a processor can issue a load register command from the same memory-mapped location in a given endpoint. A memory read packet can be generated with the same memory-mapped address and header information. The packet can propagate through the PCIe fabric to the respective endpoint. Routing can be based on the address in the header as discussed herein, even though multiple addresses may map to cores of the same physical device. Once the endpoint receives the memory read packet, a completion with data packet can be generated, with a header that includes the identifier used to rout the packet through the fabric, and in turn updates the targeted CPU register and terminates the transaction. FIG. 4 illustrates a layered structure 406 of an example multi-core device, which can include a transaction layer, data link layer, and physical layer used to transmit data to, and receive data from, respective PCIe cores 404 in this example, where each core can be used to emulate a different PCIe device endpoint.

As mentioned, optimization can be performed that is specific to a customer or an application. In at least some embodiments, hints can be hidden in special fields in the PCIe packets that indicate how to further relax ordering for a specific transaction. In a primary approach in some embodiments, ordering is only enforced on writes if they are associated with the same domain or PCI_ID, such as may correspond to a given virtual machine. It might be the case, however, that a virtual machine has several processors running on top of it that operate independently. The hint information can be used to indicate whether to enforce ordering on writes from the various processors for the same ordering domain, which enables enforcement to be even more relaxed. A PCIe switch in the fabric can also make routing decisions that may impact the enforcement in at least some embodiments, such as where each component has a read channel and a write channel.

Figure 5:
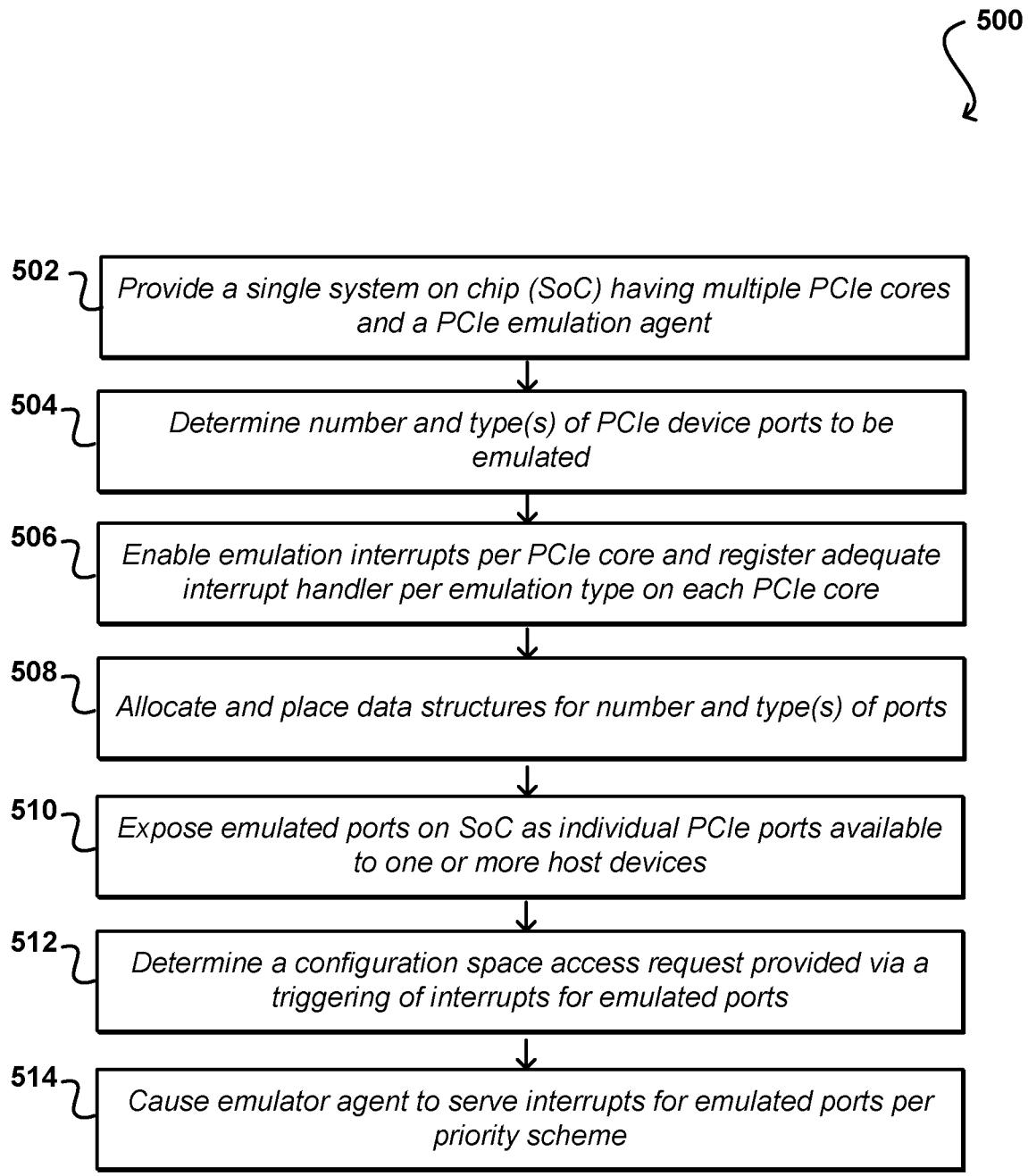
FIG. 5 illustrates an example process for emulating ports that can be utilized in accordance with various embodiments.

FIG. 5 illustrates an example process 500 for emulating multiple ports for data transactions that can be utilized in accordance with various embodiments. It should be understood for this and other processes discussed herein that there can be additional, alternative, or fewer steps performed in similar or alternative orders, or in parallel, within the scope of the various embodiments unless otherwise stated. Further, although PCIe operations are used as an example, it should be understood that various other types of operations or functionality can benefit from aspects of the various embodiments as well, as would be apparent to one of ordinary skill in the art in light of the teachings and suggestions contained herein. In this example, a single system on chip (SoC) device is provided 502, where that SoC device contains multiple PCIe cores and a PCIe emulation agent. During a boot process, as one example, a number of PCIe device ports to be emulated on the SoC can be determined 504, as well as the type(s) of ports to be emulated. As mentioned, these can include storage or networking ports, among other such options. Emulation interrupts can be enabled 506 per PCIe core, and adequate interrupt handler per emulation type registered on each PCIe core. Data structures can also be dynamically determined, allocated, and placed 508 for the determined number and type(s) of ports to be emulated. These emulated ports on the SoC can then be exposed 510 as individual PCIe ports available to one or more host devices for communication, wherein the single SoC can engage in multiple concurrent PCIe transactions with multiple hosts. A configuration space access request can be determined 512, as may be provided via a triggering of interrupts for one or more of the emulated ports. The PCIe emulation agent can be caused 514 to serve the interrupts for multiple ports according to a priority scheme, such as a round robin scheme used to ensure that no starvation would occur for any of the served ports. For certain interrupts a higher priority can be set to cause those interrupts to be processed more quickly.

Figure 6:
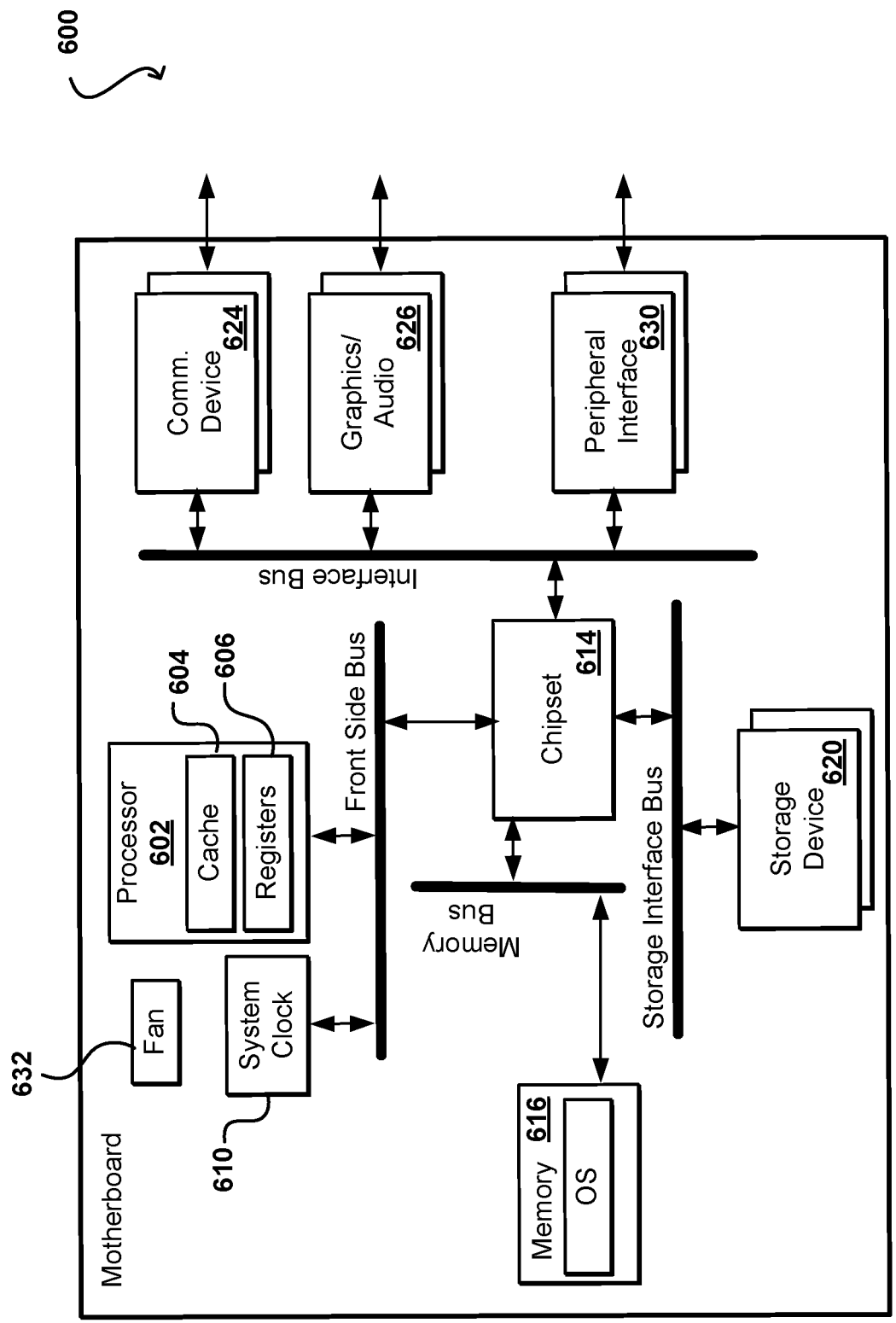
FIG. 6 illustrates components of an example computing device that can be utilized in accordance with various embodiments.

Computing resources, such as servers, that can have software and/or firmware updated in such a matter will generally include at least a set of standard components configured for general purpose operation, although various proprietary components and configurations can be used as well within the scope of the various embodiments. FIG. 6 illustrates components of an example computing device 600 that can be utilized in accordance with various embodiments. As known for computing devices, the computer will have one or more processors 602, such as central processing units (CPUs), graphics processing units (GPUs), and the like, that are electronically and/or communicatively coupled with various components using various buses, traces, and other such mechanisms. A processor 602 can include memory registers 606 and cache memory 604 for holding instructions, data, and the like. In this example, a chipset 614, which can include a northbridge and southbridge in some embodiments, can work with the various system buses to connect the processor 602 to components such as system memory 616, in the form or physical RAM or ROM, which can include the code for the operating system as well as various other instructions and data utilized for operation of the computing device. The computing device can also contain, or communicate with, one or more storage devices 620, such as hard drives, flash drives, optical storage, and the like, for persisting data and instructions similar, or in addition to, those stored in the processor and memory. The processor 602 can also communicate with various other components via the chipset 614 and an interface bus (or graphics bus, etc.), where those components can include communications devices 624 such as cellular modems or network cards, media components 626, such as graphics cards and audio components, and peripheral interfaces 630 for connecting peripheral devices, such as printers, keyboards, and the like. At least one cooling fan 632 or other such temperature regulating or reduction component can also be included as well, which can be driven by the processor or triggered by various other sensors or components on, or remote from, the device. Various other or alternative components and configurations can be utilized as well as known in the art for computing devices.

At least one processor 602 can obtain data from physical memory 616, such as a dynamic random access memory (DRAM) module, via a coherency fabric in some embodiments. It should be understood that various architectures can be utilized for such a computing device, that may include varying selections, numbers, and arguments of buses and bridges within the scope of the various embodiments. The data in memory may be managed and accessed by a memory controller, such as a DDR controller, through the coherency fabric. The data may be temporarily stored in a processor cache 604 in at least some embodiments. The computing device 600 can also support multiple I/O devices using a set of I/O controllers connected via an I/O bus. There may be I/O controllers to support respective types of I/O devices, such as a universal serial bus (USB) device, data storage (e.g., flash or disk storage), a network card, a peripheral component interconnect express (PCIe) card or interface 630, a communication device 624, a graphics or audio card 626, and a direct memory access (DMA) card, among other such options. In some embodiments, components such as the processor, controllers, and caches can be configured on a single card, board, or chip (i.e., a system-on-chip implementation), while in other embodiments at least some of the components may be located in different locations, etc.

An operating system (OS) running on the processor 602 can help to manage the various devices that may be utilized to provide input to be processed. This can include, for example, utilizing relevant device drivers to enable interaction with various I/O devices, where those devices may relate to data storage, device communications, user interfaces, and the like. The various I/O devices will typically connect via various device ports and communicate with the processor and other device components over one or more buses. There can be specific types of buses that provide for communications according to specific protocols, as may include peripheral component interconnect) PCI or small computer system interface (SCSI) communications, among other such options. Communications can occur using registers associated with the respective ports, including registers such as data-in and data-out registers. Communications can also occur using memory-mapped I/O, where a portion of the address space of a processor is mapped to a specific device, and data is written directly to, and from, that portion of the address space.

Such a device may be used, for example, as a server in a server farm or data warehouse. Server computers often have a need to perform tasks outside the environment of the CPU and main memory (i.e., RAM). For example, the server may need to communicate with external entities (e.g., other servers) or process data using an external processor (e.g., a General Purpose Graphical Processing Unit (GPGPU)). In such cases, the CPU may interface with one or more I/O devices. In some cases, these I/O devices may be special-purpose hardware designed to perform a specific role. For example, an Ethernet network interface controller (NIC) may be implemented as an application specific integrated circuit (ASIC) comprising digital logic operable to send and receive packets.

In an illustrative embodiment, a host computing device is associated with various hardware components, software components and respective configurations that facilitate the execution of I/O requests. One such component is an I/O adapter that inputs and/or outputs data along a communication channel. In one aspect, the I/O adapter device can communicate as a standard bridge component for facilitating access between various physical and emulated components and a communication channel. In another aspect, the I/O adapter device can include embedded microprocessors to allow the I/O adapter device to execute computer executable instructions related to the implementation of management functions or the management of one or more such management functions, or to execute other computer executable instructions related to the implementation of the I/O adapter device. In some embodiments, the I/O adapter device may be implemented using multiple discrete hardware elements, such as multiple cards or other devices. A management controller can be configured in such a way to be electrically isolated from any other component in the host device other than the I/O adapter device. In some embodiments, the I/O adapter device is attached externally to the host device. In some embodiments, the I/O adapter device is internally integrated into the host device. Also in communication with the I/O adapter device may be an external communication port component for establishing communication channels between the host device and one or more network-based services or other network-attached or direct-attached computing devices. Illustratively, the external communication port component can correspond to a network switch, sometimes known as a Top of Rack ("TOR") switch. The I/O adapter device can utilize the external communication port component to maintain communication channels between one or more services and the host device, such as health check services, financial services, and the like.

The I/O adapter device can also be in communication with a Basic Input/Output System (BIOS) component. The BIOS component can include non-transitory executable code, often referred to as firmware, Which can be executed by one or more processors and used to cause components of the host device to initialize and identify system devices such as the video display card, keyboard and mouse, hard disk drive, optical disc drive and other hardware. The BIOS component can also include or locate boot loader software that will be utilized to boot the host device. For example, in one embodiment, the BIOS component can include executable code that, when executed by a processor, causes the host device to attempt to locate Preboot Execution Environment (PXE) boot software. Additionally, the BIOS component can include or takes the benefit of a hardware latch that is electrically controlled by the I/O adapter device. The hardware latch can restrict access to one or more aspects of the BIOS component, such controlling modifications or configurations of the executable code maintained in the BIOS component. The BIOS component can be connected to (or in communication with) a number of additional computing device resources components, such as processors, memory, and the like. In one embodiment, such computing device resource components may be physical computing device resources in communication with other components via the communication channel. The communication channel can correspond to one or more communication buses, such as a shared bus (e.g., a front side bus, a memory bus), a point-to-point bus such as a PCI or PCI Express bus, etc., in which the components of the bare metal host device communicate. Other types of communication channels, communication media, communication buses or communication protocols (e.g., the Ethernet communication protocol) may also be utilized. Additionally, in other embodiments, one or more of the computing device resource components may be virtualized hardware components emulated by the host device. In such embodiments, the adapter device can implement a management process in which a host device is configured with physical or emulated hardware components based on a variety of criteria. The computing device resource components may be in communication with the iii adapter device via the communication channel. In addition, a communication channel may connect a PCI Express device to a CPU via a northbridge or host bridge, among other such options.

In communication with the I/O adapter device via the communication channel may be one or more controller components for managing hard drives or other forms of memory. An example of a controller component can be a SATA hard drive controller. Similar to the BIOS component, the controller components can include or take the benefit of a hardware latch that is electrically controlled by the I/O adapter device. The hardware latch can restrict access to one or more aspects of the controller component. Illustratively, the hardware latches may be controlled together or independently. For example, the I/O adapter device in ay selectively close a hardware latch for one or more components based on a trust level associated with a particular user. In another example, the I/O adapter device may selectively close a hardware latch for one or more components based on a trust level associated with an author or distributor of the executable code to be executed by the I/O adapter device. In a further example, the I/O adapter device may selectively close a hardware latch for one or more components based on a trust level associated with the component itself. The host device can also include additional components that are in communication with one or more of the illustrative components associated with the host device. Such components can include devices, such as one or more controllers in combination with one or more peripheral devices, such as hard disks or other storage devices. Additionally, the additional components of the host device can include another set of peripheral devices, such as Graphics Processing Units ("GPUs"). The peripheral devices and can also be associated with hardware latches for restricting access to one or more aspects of the component. As mentioned above, in one embodiment, the hardware latches may be controlled together or independently.

Figure 7:
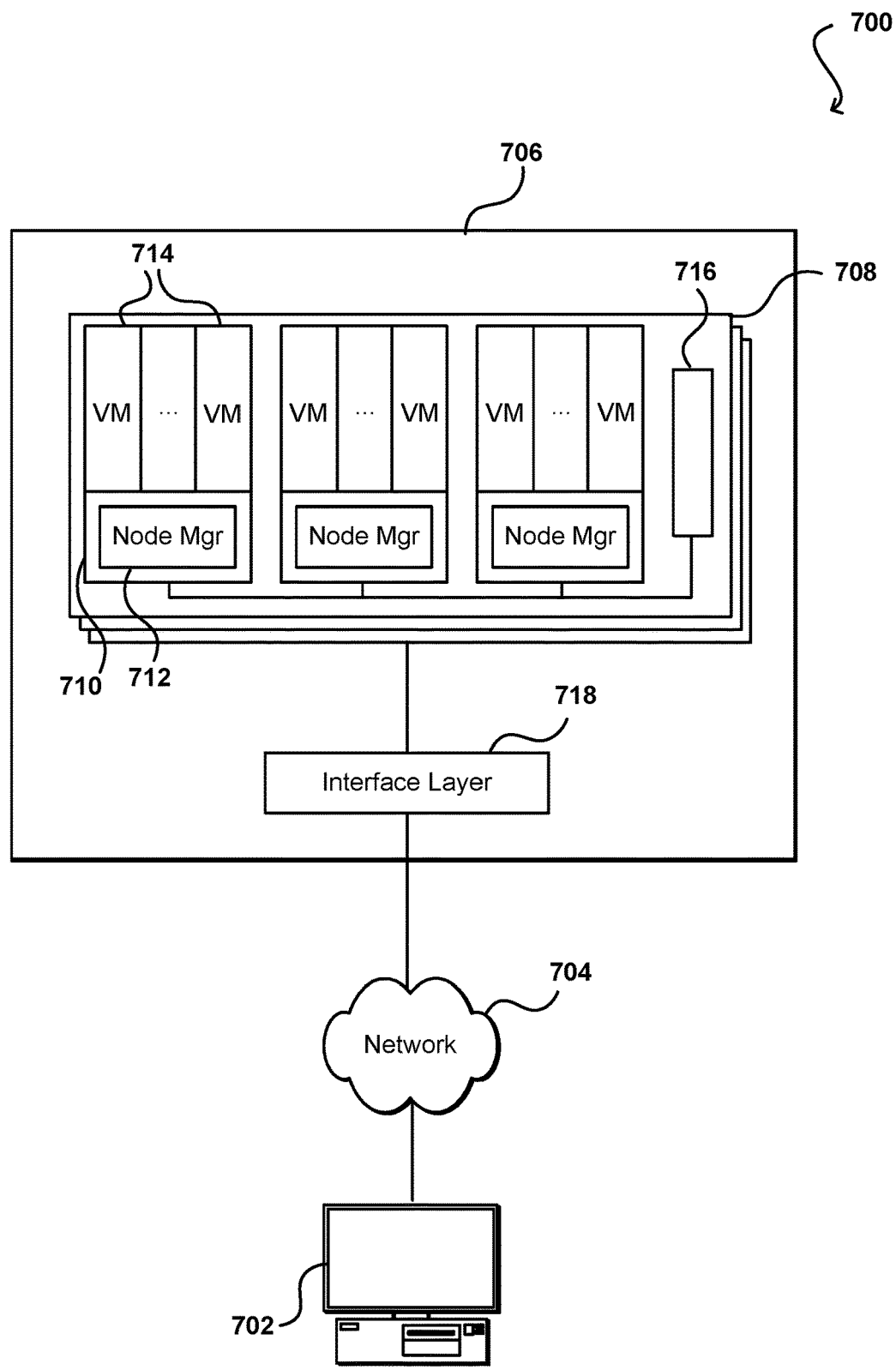
FIG. 7 illustrates components of an example environment in which aspects of the various embodiments can be implemented.

FIG. 7 illustrates an example environment 700 in which aspects of the various embodiments can be implemented. In this example, a user is able to utilize a computing device 702 to submit a call or request across at least one network 704 to be received to a shared resource environment 706, such as a data center or "cloud" environment, among other such options. The computing device 702 can include any appropriate device, as may include client devices such as personal computers, cell phones, handheld messaging devices, laptop computers, set-top boxes, personal data assistants, electronic book readers, and the like. The at least one network 704 can include any appropriate wired and/or wireless network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail.

The resource environment 706 in this example includes an interface layer 718, as may include components such as application programming interfaces (APIs), routers, switches, Web servers, and other such components known or used for routing communications from a user computing device 702 to an appropriate resource in the environment. In this example, the resource environment 706 includes a number of racks 708, each rack including a number of host computing devices 710, as well as an optional rack support computing system 716 in this example embodiment. The host computing systems 710 on one of the illustrated racks 708 each host one or more virtual machines 714 in this example, as well as a distinct virtual machine manager 712 associated with the virtual machines on that host computing system. The virtual machine manager (VMM) is tasked with managing the virtual machines (VMs) on the respective host device, and handling various aspects of virtualization. Each virtual machine 714 can act as an independent computing resource for executing one or more tasks on behalf of a user, where the virtual machine functions as a dedicated resource for the user. The environment can also include additional host computing systems that do not include distinct virtual machines, but may nonetheless each act as a computing resource for one or more users. The rack support computing system 716 may provide various utility services for other computing systems local to its rack (e.g., long-term program storage, metering, and other monitoring of program execution and/or of non-local block data storage access performed by other computing systems local to the rack, etc.), as well as possibly to other computing systems located in the environment 706. Each computing system may also have one or more local attached storage devices (not shown), such as to store local copies of programs and/or data created by or otherwise used by the executing programs, as well as various other components.

It will be appreciated that the example of FIG. 7 has been simplified for the purposes of explanation, and that the number and organization of host computing systems and other devices may be much larger than what is depicted in FIG. 7. For example, as one illustrative embodiment, there may be approximately tens of thousands of computing systems in a cloud environment, with at least some of those computing systems being host computing systems that may each host multiple virtual machines.

Figure 8:
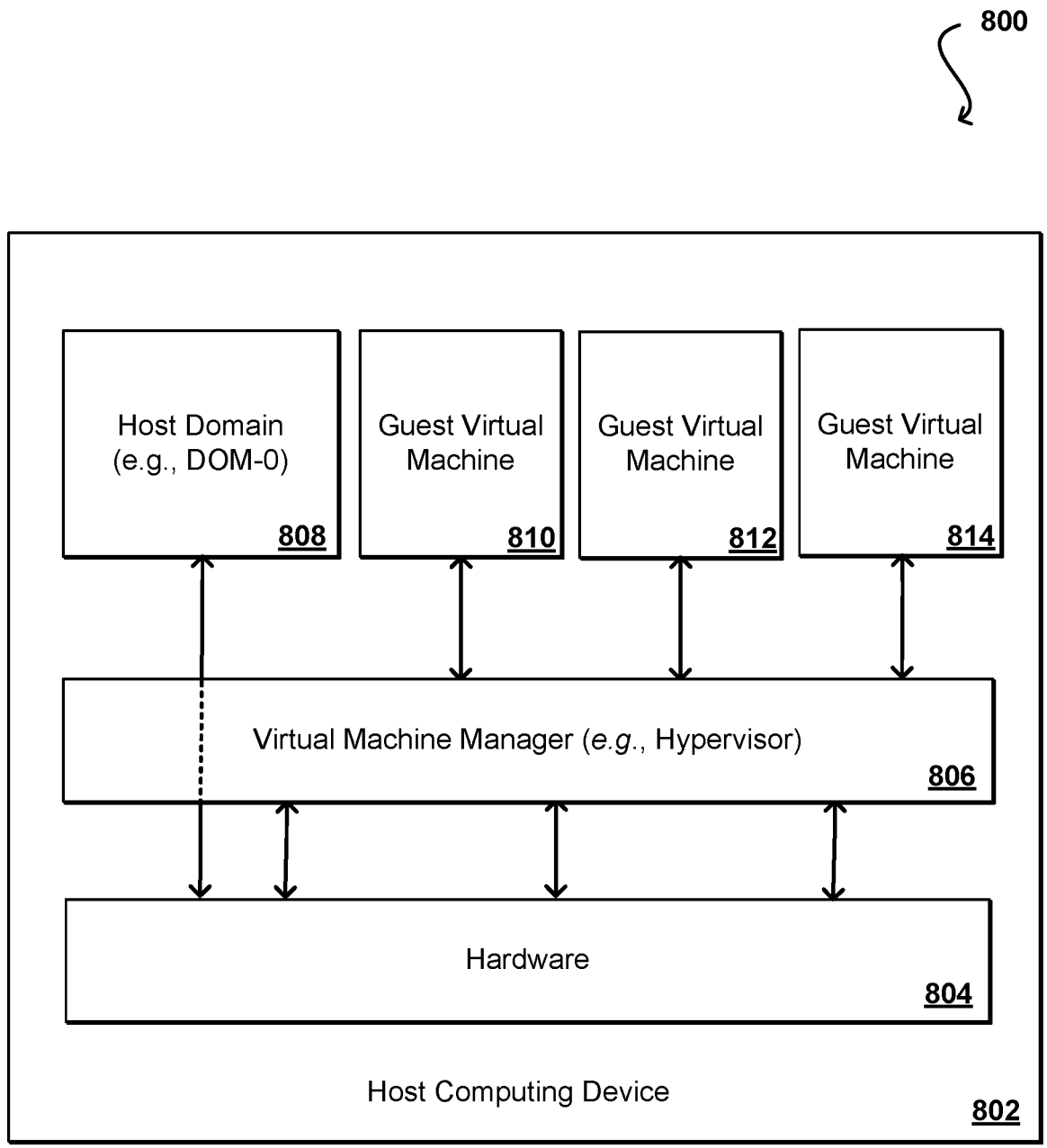
FIG. 8 illustrates components supporting virtual machines on a host device that can be utilized in accordance with various embodiments.

A number of virtualization techniques can be used to simultaneously operate a plurality of guest virtual machines (VMs) or guest operating systems (OSs) on a given host machine. FIG. 8 illustrates an example 800 of utilizing one virtualization technique using a virtual machine manager (VMM), such as a hypervisor, in accordance with various embodiments. The hardware 804 (e.g., the central processor and other such components) of the host computing device 802 is able to interface with the VMM 806 running directly on the hardware 804, such in the case of a "bare metal" or native hypervisor. Examples of hypervisors useful for such purposes include Xen, Hyper-V®, and the like. Hypervisors typically run at a higher, more privileged processor state than any other software on the machine, and provide services such as memory management and processor scheduling for dependent layers and/or domains. The most privileged of such layers and/or domains resides in the service domain layer, which may include a host domain 808 that may include an administrative operating system for configuring the operation and functionality of the hypervisor 806, as well as that of domains of lower privilege, such as the domains of the guest virtual machines 810, 812, 814 or other operating systems, which may be heterogeneous (i.e., running different operating systems than each other). The host domain 808 (e.g., the DOM-0) may have direct access to the hardware resources 804 of the host computing device 802 by way of the hypervisor 806, while the guest virtual machine domains 810, 812, 814 may not.

Figure 9:
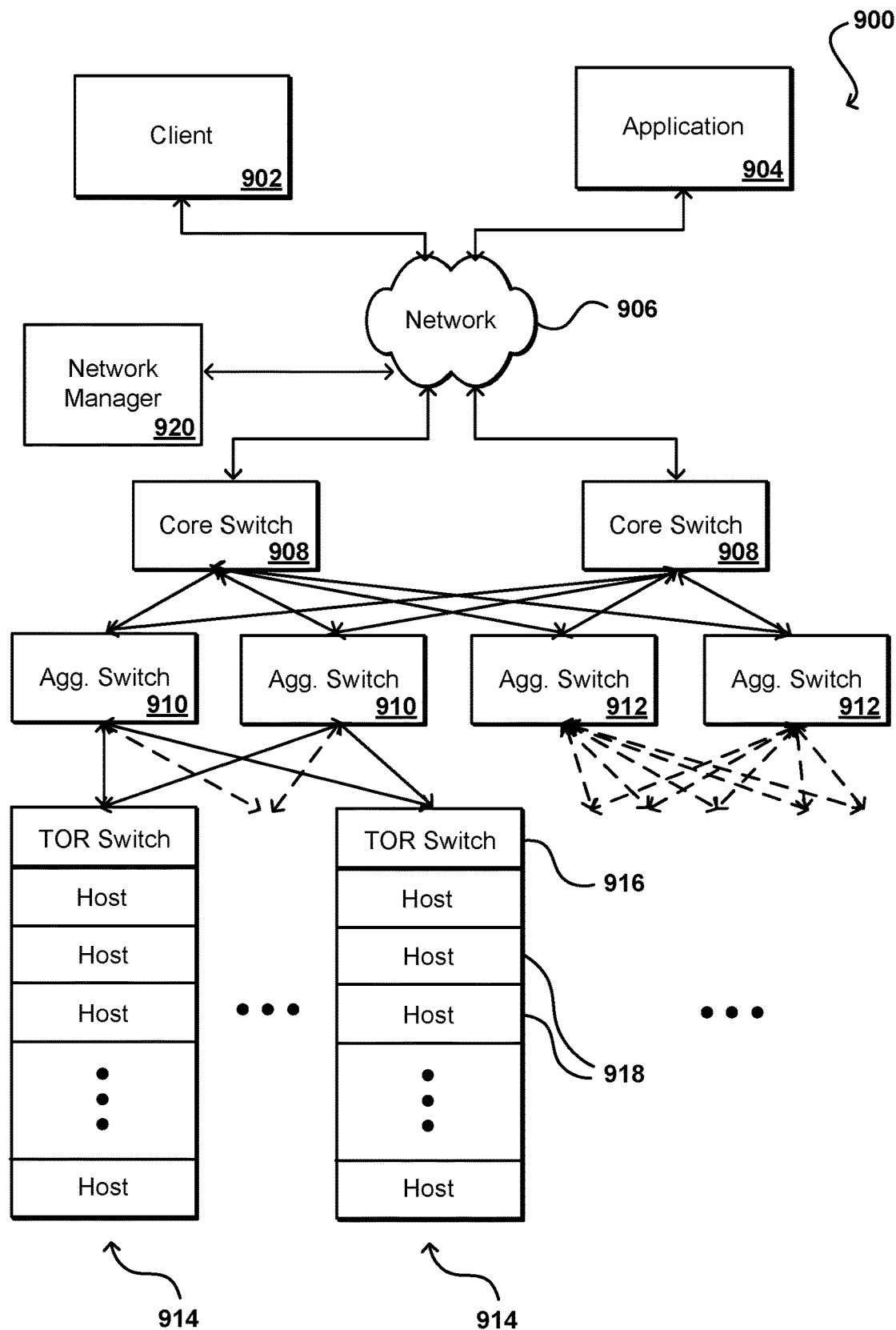
FIG. 9 illustrates components of an example environment in which aspects of the various embodiments can be implemented.

As mentioned, PCIe devices may be utilized in a shared resource environment, such as a data center or server farm. FIG. 9 illustrates an example network configuration 900 that can be used to route communications between specific host machines or other such devices in such an environment. This example shows a typical design that can be used for a data center, wherein a source such as a client device 902 or application 904 is able to send requests across at least one network 906, such as the Internet or a cellular network, to be received by one or more components of the data center. Properties of various components of the network, such as provisioned instances, etc., can be managed using at least one management system, component, or service 920. In this example, the requests are received over the network to one of a plurality of core switches 908, but it should be understood that there can be any of a number of other components between the network and the core switches as known in the art. As traditional differentiators have substantially disappeared, the terms "switch" and "router" can be used interchangeably. For purposes of clarity and explanation this document standardizes on the term "switch," but it should be understood this term as used also encompasses routers and other devices or components used for such purposes. Further, the switches can include any appropriate switch, such as a multilayer switch that operates at different levels in an OSI (Open System Interconnection) reference model.

As illustrated, each core switch 908 is able to communicate with each of a plurality of aggregation switches 910, 912, which in at least some embodiments are utilized in pairs. Utilizing aggregation switches in pairs provides a redundant capability in case one or the switches experiences a failure or is otherwise unavailable, such that the other device can route traffic for the connected devices. As can be seen, each core switch in this example is connected to each aggregation switch, such that the tiers in this example are fully connected. Each pair of aggregation switches 910, 912 is linked to a plurality of physical racks 914, each of which typically contains a top of rack (TOR) or "access" switch 916 and a plurality of physical host machines 918, such as data servers and other processing devices. As shown, each aggregation switch can be connected to a number of different racks, each with a number of host machines. For the respective portion of the network, the aggregation pairs are also fully connected to the TOR switches.

As an additional benefit, the use of aggregation switch pairs enables the capability of a link to be exceeded during peak periods, for example, wherein both aggregation switches can concurrently handle and route traffic. Each pair of aggregation switches can service a dedicated number of racks, such as one hundred twenty racks, based on factors such as capacity, number of ports, etc. There can be any appropriate number of aggregation switches in a data center, such as six aggregation pairs. The traffic from the aggregation pairs can be aggregated by the core switches, which can pass the traffic "up and out" of the data center, such as back across the network 906. In some embodiments, the core switches are provided in pairs as well, for purposes including redundancy.

In some embodiments, such as high radix interconnection networks utilized for high-performance computing (HPC) or other such purposes, each physical rack can contain multiple switches. Instead of a single physical TOR switch connecting twenty-one hosts in a rack, for example, each of three switches in the rack can act as a local TOR switch for a "logical" rack (a sub-rack of a physical rack or logical grouping of devices (hosts and/or switches) from multiple racks), with each local TOR switch connecting seven of the host machines. The logical racks can be implemented using physical or wireless switches in different embodiments. In some embodiments each of these switches within a high performance computing rack manages up to twelve servers, but the number can vary depending on factors such as the number of ports on each switch. For example, if a switch contains twenty-four ports, half of those ports typically will be host-facing and the other half will face the external network. A design in accordance with one embodiment could utilize seven racks with three switches in each, with each switch communicating (redundantly) with twelve servers, which would generally be equivalent to twenty-one separate racks each with a single TOR switch communicating with twelve servers, for example. In subsequent figures and description, it should be understood that physical or logical racks can be used within the scope of the various embodiments.

Figure 10:
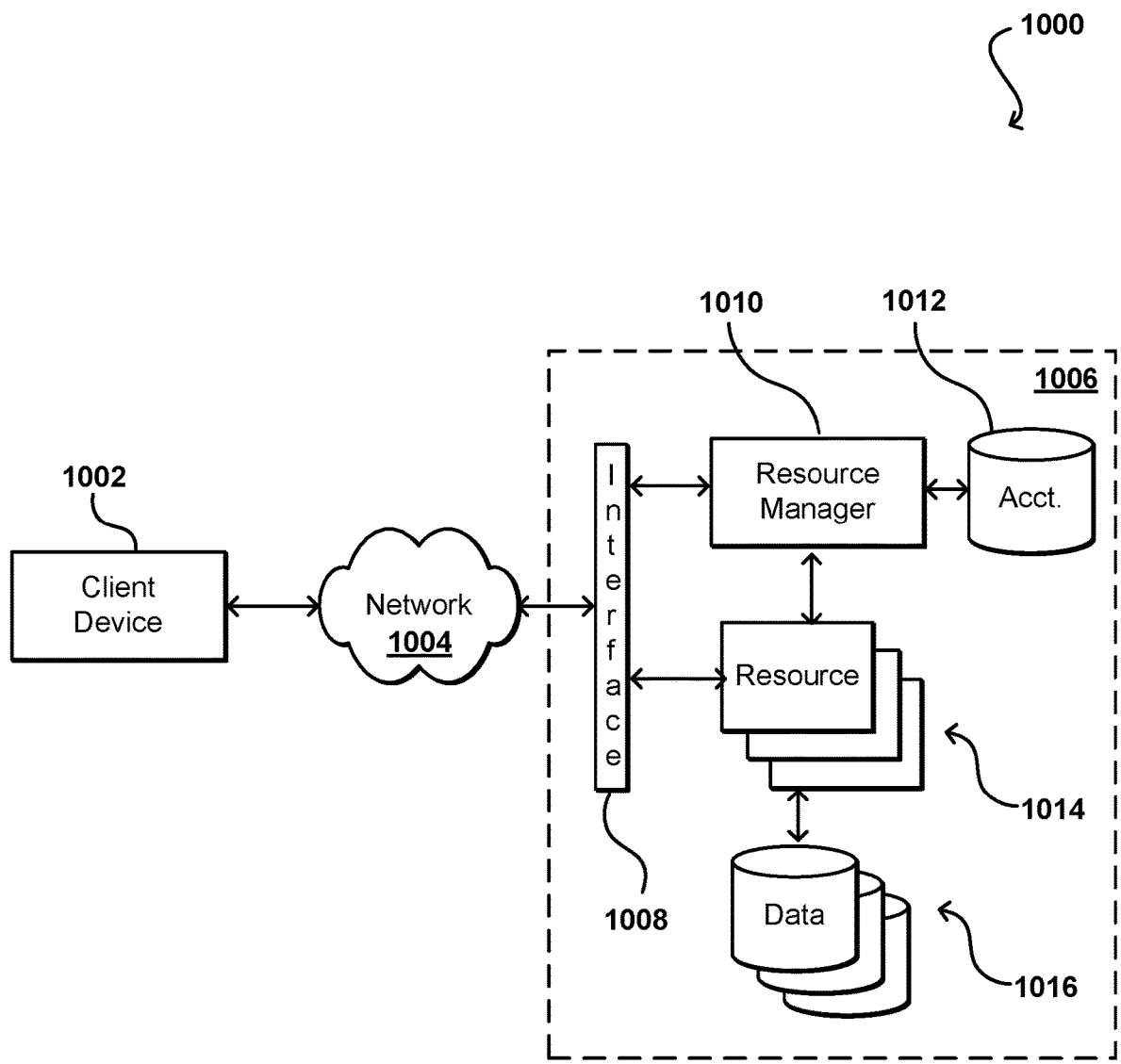
FIG. 10 illustrates components of another example environment that can be used to implement aspects of the various embodiments.

As mentioned, such a configuration can be used in some embodiments to provide resource capacity for one or more users or customers as part of a shared resource environment. FIG. 10 illustrates an example of one such environment 1000 in which aspects of the various embodiments can be implemented. In this example a user is able to utilize a client device 1002 to submit requests across at least one network 1004 to a multi-tenant resource provider environment 1006. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 1004 can include any appropriate network, including an intranet, the Internet, a cellular network, a local area network (LAN), or any other such network or combination, and communication over the network can be enabled via wired and/or wireless connections. The resource provider environment 1006 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 1014 of one or more types. These types can include, for example, application servers operable to process instructions provided by a user or database servers operable to process data stored in one or more data stores 1016 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 1014 can submit a request that is received to an interface layer 1008 of the provider environment 1006. The interface layer can include application programming interfaces (APIs) or other exposed interfaces enabling a user to submit requests to the provider environment. The interface layer 1008 in this example can also include other components as well, such as at least one Web server, routing components, load balancers, and the like. When a request to provision a resource is received to the interface layer 1008, information for the request can be directed to a resource manager 1010 or other such system, service, or component configured to manage user accounts and information, resource provisioning and usage, and other such aspects. A resource manager 1010 receiving the request can perform tasks such as to authenticate an identity of the user submitting the request, as well as to determine whether that user has an existing account with the resource provider, where the account data may be stored in at least one data store 1012 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 1002 to communicate with an allocated resource without having to communicate with the resource manager 1010, at least until such time as a relevant aspect of the user account changes, the user is no longer granted access to the resource, or another such aspect changes.

The resource manager 1010 (or another such system or service) in this example can also function as a virtual layer of hardware and software components that handles control functions in addition to management actions, as may include provisioning, scaling, replication, etc. The resource manager can utilize dedicated APIs in the interface layer 1008, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 1008 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments. Additionally, if a particular decision or action is described as being made or performed "based on" a condition or piece of information, this should not be interpreted as that decision or action being made or performed exclusively based on that condition or piece of information, unless explicitly so stated.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    determining emulation to be performed on a single system on chip (SoC) device having multiple peripheral component interconnect express (PCIe) ports, the PCIe ports to enable communication to one or more host devices;
    allocating, via an emulation agent on the SoC, a set of data structures for a number of the PCIe ports, the PCIe ports capable of being of one or more types with corresponding data structures;
    determining a configuration space access request, provided via triggering of an interrupt, associated with a specified PCIe port of the number of the PCIe ports; and
    serving the access request using a processor on the single SoC device.

2. The computer-implemented method of claim 1, wherein the configuration space access request is served according to a round robin priority scheme.

3. The computer-implemented method of claim 1, wherein the configuration space access request is provided via triggering of the interrupt for a PCIe port or polling of a central processing unit (CPU) core.

4. The computer-implemented method of claim 1, wherein each PCIe port has an associated PCIe wrapper for a configuration transaction and an associated PCIe logger for memory transactions.

5. The computer-implemented method of claim 1, further comprising:
    enabling a single PCIe port to be bifurcated across two or more of the emulated PCIe ports on the single SoC.

6. A computer-implemented method, comprising:
    providing emulation for a set of peripheral component interconnect express (PCIe) ports on a single device;
    determining a configuration space access request, provided via triggering of an interrupt, associated with a specified PCIe port of the set of PCIe ports; and
    causing the access request to be served by a processor on the single device.

7. The computer-implemented method of claim 6, wherein the configuration space access request is provided via triggering of the interrupt for a PCIe core or polling of a central processing unit (CPU) core.

8. The computer-implemented method of claim 7, wherein the interrupt includes a PCIe configuration space interrupt or a PCIe controller interrupt.

9. The computer-implemented method of claim 6, wherein the single device is a system on chip (SoC) device including the set of PCIe ports.

10. The computer-implemented method of claim 6, wherein the set of PCIe ports enables PCIe communication transactions between the single hardware device and (a) separate PCI root complex ports of a single host or (b) two separate hosts.

11. The computer-implemented method of claim 6, wherein emulation for the PCIe ports on the single device is managed using an emulation agent executing on a processor of the single device.

12. The computer-implemented method of claim 10, wherein the emulation agent allocates respective data structures for the PCIe ports of the set.

13. The computer-implemented method of claim 6, further comprising:
    causing interrupts for the set of PCIe ports to be served according to a round robin priority scheme.

14. The computer-implemented method of claim 6, further comprising:
    enabling a single device to be bifurcated across two or more of the PCIe ports.

15. A system, comprising:
    a processor; and
    memory including instructions that, when executed by the processor, cause the system to:
        provide emulation for a set of peripheral component interconnect express (PCIe) ports on a single device;
        determine a configuration space access request, provided via triggering of an interrupt, associated with a specified PCIe port of the set of PCIe ports; and
        cause the access request to be served by a processor on the single device.

16. The system of claim 15, wherein the configuration space access request is provided via triggering of the interrupt for a PCIe core or polling of a central processing unit (CPU) core.

17. The system of claim 15, wherein the single device is a system on chip (SoC) device including the set of PCIe ports.

18. The system of claim 15, wherein the set of PCIe ports enables PCIe communication transactions between the single hardware device and (a) separate PCI root complex ports of a single host or (b) two separate hosts.

19. The system of claim 15, wherein emulation of the PCIe ports on the single device is managed using an emulation agent executing on a processor of the single device, wherein the emulation agent allocates respective data structures for the PCIe ports of the set.

20. The system of claim 15, wherein the instructions when executed further cause the system to:
  enable a single PCIe device to be bifurcated across two or more of the PCIe ports.

\* \* \* \* \*